(12) United States Patent
Mahmud et al.

(10) Patent No.: US 9,741,259 B2
(45) Date of Patent: Aug. 22, 2017

(54) IDENTIFICATION FOR PERFORMING TASKS IN OPEN SOCIAL MEDIA

(71) Applicant: INTERNATIONAL BUSINESS MACHINES CORPORATION, Armonk, NY (US)

(72) Inventors: Jalal U. Mahmud, San Jose, CA (US); Nimrod Megiddo, Palo Alto, CA (US); Jeffrey W. Nichols, San Jose, CA (US); Michelle X. Zhou, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 748 days.

(21) Appl. No.: 13/664,582

(22) Filed: Oct. 31, 2012

(65) Prior Publication Data

US 2014/0120515 A1    May 1, 2014

(51) Int. Cl.
*G09B 7/00* (2006.01)

(52) U.S. Cl.
CPC ..................... *G09B 7/00* (2013.01)

(58) Field of Classification Search
CPC ....................................... G09B 7/00
USPC ........................................ 434/362
See application file for complete search history.

(56) References Cited

U.S. PATENT DOCUMENTS

| | | | |
|---|---|---|---|
| 5,961,332 A * | 10/1999 | Joao | G06F 19/363 128/923 |
| 6,389,400 B1 | 5/2002 | Bushey et al. | |
| 8,156,064 B2 | 4/2012 | Brown | |
| 8,276,207 B2 * | 9/2012 | Walsh et al. | 726/26 |
| 8,781,984 B2 * | 7/2014 | Schreiner et al. | 706/45 |
| 2004/0148275 A1 * | 7/2004 | Achlioptas | G06F 17/30867 |
| 2006/0212931 A1 * | 9/2006 | Shull | G06F 21/55 726/10 |
| 2007/0208630 A1 * | 9/2007 | Chatter | G06Q 30/0241 705/26.3 |
| 2007/0271138 A1 * | 11/2007 | Van Der Linden et al. | 705/14 |

(Continued)

OTHER PUBLICATIONS

Warriorforum.com, "WarriorForum—Internet Marketing Forums", Jul. 26, 2011, pp. 1-4, Internet Warriors, USA.

(Continued)

*Primary Examiner* — Sam Yao
*Assistant Examiner* — Alvin Carlos
(74) *Attorney, Agent, or Firm* — Sherman IP LLP; Kenneth L. Sherman; Steven Laut (57) ABSTRACT

Embodiments of the invention relate to user identification in social media for task performance based on past usage and traits. One embodiment includes identifying users of a social media platform for ability of performing a task. Readiness scores are predicted based on past usage of the social media platform. A predicted readiness score includes a value corresponding to whether a user is predicted to be ready for performing the task. Users that are ready to perform the task are determined based on comparing the readiness scores with a threshold. Willingness scores for performing the task by the users determined to be able and ready to perform the task are determined. A willingness score includes a value corresponding to whether a user is estimated to be willing for performing the task. Users that are willing to perform the task are determined based on comparing the willingness scores with a threshold.

20 Claims, 5 Drawing Sheets

(56) References Cited

U.S. PATENT DOCUMENTS

| | | | |
|---|---|---|---|
| 2008/0077517 A1* | 3/2008 | Sappington | 705/35 |
| 2008/0109491 A1* | 5/2008 | Gupta | 707/104.1 |
| 2008/0189164 A1* | 8/2008 | Wiseman et al. | 705/10 |
| 2009/0132395 A1* | 5/2009 | Lam | G06F 17/30699 705/30 |
| 2009/0299993 A1 | 12/2009 | Novack | |
| 2010/0114744 A1* | 5/2010 | Gonen | 705/35 |
| 2010/0115040 A1* | 5/2010 | Sargent et al. | 709/206 |
| 2011/0113349 A1* | 5/2011 | Kiciman | G06F 17/241 715/753 |
| 2011/0119335 A1* | 5/2011 | Galbreath et al. | 709/204 |
| 2011/0208687 A1* | 8/2011 | Dube | G06Q 10/107 706/54 |
| 2012/0072384 A1 | 3/2012 | Schreiner et al. | |
| 2012/0095976 A1* | 4/2012 | Hebenthal | G06F 17/30867 707/706 |
| 2012/0209918 A1* | 8/2012 | Shah | G06Q 30/0251 709/205 |
| 2012/0209919 A1* | 8/2012 | Shah | G06Q 30/0251 709/205 |
| 2013/0173616 A1* | 7/2013 | Fekri et al. | 707/736 |
| 2013/0226912 A1* | 8/2013 | Agapiev | 707/723 |

OTHER PUBLICATIONS

Slickdeals.net, "Product Reviews—SlickDeals.net Forums", Nov. 28, 2010, pp. 1-4, Slickdeals, Inc., USA.

Quora.com, "Press—Quora", 2009, pp. 1-2, Quora, USA.

Answers.yahoo.com, "Yahoo! Answers", Jul. 24, 2011, pp. 1-4, Yahoo!, USA.

Pal, A. et al., "Early Detection of Potential Experts in Question Answering Communities", Proceedings of the 19th International Conference on User Modeling, Adaptation, and Personalization (UMAP '11), Jul. 2011, pp. 231-242, Springer-Verlag Berlin, Heidelberg, Germany.

Pennacchiotti, M. et al., "A Machine Learning Approach to Twitter User Classification", Proceedings of the Fifth International AAAI Conference on Weblogs and Social Media, Jul. 2011, pp. 281-288, Association for the Advancement of Artificial Intelligence, USA.

Cheng, Z. et al., "You Are Where You Tweet: A Content-Based Approach to Geo-Locating Twitter Users", Proceedings of the 19th ACM International Conference on Information and Knowledge Management (CIKM '10), Oct. 2010, pp. 750-768 ACM, USA.

Mairesse, F. et al., "Words Mark the Nerds: Computational Models of Personality Recognition through Language", Proceedings of the 28th Annual Conference of the Cognitive Science Society, Jul. 2006, pp. 543-548, Cognitive Science Society, USA.

LIWC, "LIWC: Linguistic Inquiry and Word Count", Jul. 23, 2011, p. 1, LIWC, Inc., USA.

Wikipedia, "Big Five Personality Traits", Mar. 22, 2011, p. 1-14, wikipedia.org, USA.

Bouguessa, M. et al., "Identifying Authoritative Actors in Question-Answering Forums—The Case of Yahoo! Answers", Proceedings of the 14th ACM SIGKDD International Conference on Knowledge Discovery and Data Mining (KDD '08), Aug. 2008, pp. 866-874, ACM, USA.

Jurczyk, P. et al., "Discovering Authorities in Question Answer Communities by Using Link Analysis", Proceedings of the 16th ACM Conference on Information and Knowledge Management (CIKM '07), Nov. 2007, pp. 919-922, ACM, USA.

Avrahami, D. et al., "Responsiveness in Instant Messaging: Predictive Models Supporting Inter-Personal Communication", Proceedings of the 2006 ACM SIGCHI Conference on Human Factors in Computing Systems (CHI '06), Apr. 2006, pp. 731-740, ACM, USA.

Begole, J. et al., "Work Rhythms: Analyzing Visualizations of Awareness Histories of Distributed Groups", Proceedings of the 2002 ACM Conference on Computer Supported Cooperative Work (CSCW '02), Nov. 2002, pp. 334-343, ACM, USA.

Cosley, D. et al., "SuggestBot: Using Intelligent Task Routing to Help People Find Work in Wikipedia", Proceedings of the 12th International Conference on Intelligent User Interfaces (IUI '07), Jan. 2007, pp. 32-41, ACM, USA.

* cited by examiner

IDENTIFICATION FOR PERFORMING TASKS IN OPEN SOCIAL MEDIA

BACKGROUND

Embodiments of the invention relate to user identification for task performance, and in particular, user identification in social media for task performance based on past usage and traits.

Social media are popular avenues for information sharing or exchange. Information sharing systems, such as forums for obtaining product reviews or social question-answering systems are sometimes helpful to users on social media platforms. People also informally exchange information in the form of questions and answers in social media, such as Facebook® and Twitter®.

One use of information exchanged in social media platforms is to perform tasks, such as translating a sentence from one language to another language, problem solving while developing software, administrative processing, shopping using a particular website, obtaining a deal for a travel website, etc. Finding the right people on social media to obtain the desired information (often for task completion) is difficult for several reasons. Maybe none of the friends in one's own social networks are able to perform a task, e.g., they may not know the answers to a specific question, they may not have gone through a certain process so they do not know the details, or they do not know the language in question. Additionally, there are a multitude of strangers on social media, and not many of the strangers may be able to perform the task, e.g., answering a question.

BRIEF SUMMARY

Embodiments of the invention relate to user identification in social media for task performance based on traits. One embodiment includes identifying multiple users of a social media platform for ability of performing a task. Readiness scores are predicted for the identified users based on past usage of the social media platform. A predicted readiness score comprises a value corresponding to whether a user is predicted to be ready for performing the task. Users that are ready to perform the task are determined based on comparing the readiness scores with a readiness score threshold. Willingness scores for performing the task by the users determined to be able and ready to perform the task are determined. A willingness score comprises a value corresponding to whether a user is estimated to be willing for performing the task. Users that are willing to perform the task are determined based on comparing the willingness scores with a willingness score threshold. The task is requested to be performed by the users determined to be willing, identified as having the ability, and determined to be ready to perform the task.

Another embodiment comprises a computer program product for determining capability of task performance in an open social media system. The computer program product comprising: a computer-readable storage medium having computer readable program code embodied therewith. The computer readable program code comprising: computer readable program code configured to identify a plurality of users of a social media platform for ability of performing a task; and computer readable program code configured to predict readiness scores for the identified users based on past usage of the social media platform. A predicted readiness score comprises a value corresponding to whether a user is predicted to be ready for performing the task. The computer program product including computer readable program code configured to determine users that are ready to perform the task based on comparing the readiness scores with a readiness score threshold; and computer readable program code configured to determine willingness scores for performing the task by the users determined to be able and ready to perform the task. A willingness score comprises a value corresponding to whether a user is estimated to be willing for performing the task. The computer program product further including computer readable program code configured to determine users that are willing to perform the task based on comparing the willingness scores with a willingness score threshold; and computer readable program code configured to request the task be performed by the users determined to be willing, identified as having the ability, and determined to be ready to perform the task.

One embodiment comprises a system. The system comprises a server device that uses a hardware processor for identifying a plurality of users of a social media platform having ability of performing a task, predicting readiness scores for the identified users based on past usage of the social media platform, wherein a predicted readiness score comprises a value corresponding to whether a user is predicted to be ready for performing the task, determines users that are ready to perform the task based on comparing the readiness scores with a readiness score threshold, determines willingness scores for performing the task by the users determined to be able and ready to perform the task, wherein a willingness score comprises a value corresponding to whether a user is estimated to be willing for performing the task, determines users that are willing to perform the task based on comparing the willingness scores with a willingness score threshold, and for requesting the task be performed by the users determined to be willing, identified as having the ability, and determined to be ready to perform the task.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
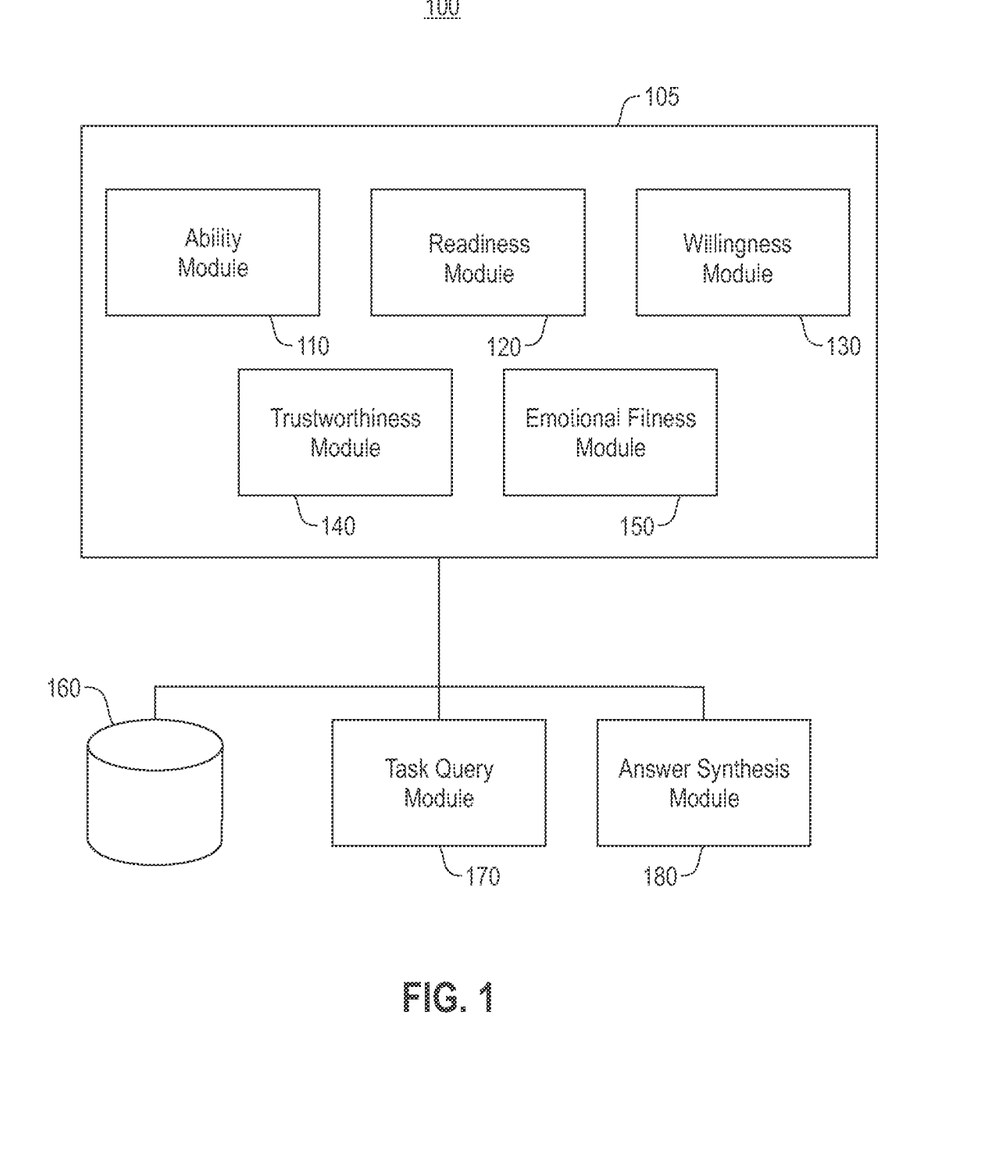
FIG. 1 illustrates a block diagram of an example system for user identification for task performance in social media based on past usage and traits, in accordance with an embodiment of the invention.

Referring now to the drawings, FIG. 1 shows an implementation of system 100 for identification in social media for task performance based on past usage and traits. In one embodiment, system 100 comprises an identification module 105, a database 160, a task query module 170, and an answer synthesis module 180. In one embodiment, the identification module 105 may include an ability module 110, a readiness module 120, a willingness module 130, a trustworthiness module 140 and an emotional fitness module 150. In other embodiments, the trustworthiness module 140 and the emotional fitness module 150 may be optional. In one embodiment, the system 100 provides users of open social media platforms a way of determining other users that may meet criteria for performing a desired task (e.g., answering a question, providing information, etc.), where the users are determined to be willing, able, ready, trustworthy and emotionally fit.

In one embodiment, the task query module 170 provides social media users that have been determined to be willing, able, ready, and optionally trustworthy and emotionally fit with a particular user's desired task (e.g., request for an answer to a question, request for information, etc.). In one example, the task query module keeps track of users that are filtered based on being willing, able, ready, trustworthy and emotionally fit for particular desired tasks. In one example, scores may be associated with particular users based on learned responses and determined traits, such as willing, able, ready, trustworthy, and emotionally fit for particular topics.

In one embodiment, the answer synthesis module 180 provides tracking to evaluate responses to requested tasks. In one example, a user may be prompted to rate another user's response to a task. In another example, all users may be tracked for determining likelihood of responding to similar requested tasks where a weighting may be applied to the users based on different topics or types of requests. In one embodiment, the answer synthesis module 180 may provide the user weighting based on defined topics and types of task requests for storage in the database 160. In another example, the answer synthesis module 180 provides response filtering based on searching response content for keywords that are predefined for use in excluding answers that are not appropriate (e.g., non-appropriate language, sarcastic language, etc.).

In one embodiment, the ability module 110 provides a way of estimating any given user's ability to perform a task. In one embodiment, the ability module 110 estimates ability using rules, heuristics, and statistical machine-learning-based models. In one example, the ability module 110 uses rule-based ability estimation for a task (e.g., a user question), where it is required that a potential responder should know information about a topic of the question (e.g., a product-review question). In one example, the ability module 110 searches for specific predefined keywords (for the domain of the question) in the user's previous social network updates (e.g., comments, chats, blogs, available user information, etc.) and determines whether there is enough overlap using similarity metrics (e.g., cosine similarity).

In one embodiment, the ability module 110 uses rule-based ability estimation for a question that requires location information of users in order to know that a user may be present in that location (e.g. for a question regarding wait time at an airport). In one example, the ability module 110 searches for certain location-specific words in user's status updates (e.g., associated user content) on a social media platform and determines whether there is a match. In other embodiments, statistical solutions may be used by the ability module 110, such as determining location identification (e.g., from ID address, GPS, triangulation, manual location entries, etc.), are applied for estimating the home location of social media users (i.e., if the question requires responders from a particular location (e.g. city or state)). Based on the ability estimation, the ability module determines or filters out users on one or more social platforms that are able to perform a task (e.g., respond/answer a question) and stores the able users in the database 160.

In one embodiment, after the ability module 110 determines users of one or more social media platforms are found that are able perform a task, the readiness module 120 estimates whether those filtered users are ready to perform the desired task. In one example, the readiness module 120 uses a model that is learned from a user's past social network behavior. In one example, the model used by the readiness module 120 predicts a score (i.e., a numerical value, such as 0 to 10, 0 to 100, etc.) of readiness, which can be compared with an empirically-determined threshold numerical value, for determining whether a user is ready to respond to a question (e.g., a question asking for help or other information).

In one example, the readiness module 120 uses a model that is trained from patterns of users in previous social network content updates (e.g., status updates, comments, chats, etc.). In one example, information regarding the time interval during the day, and the particular day of the week is used. For each time interval and day of the week, a user may have a specific social network usage behavior (e.g., average content update frequency) that is used to learn with a statistical model. In one example, once the model learns usage patterns, the readiness module 120 may be used to predict a readiness score for each user at a given time on a given day of the week.

In one embodiment, the readiness module 120 also uses heuristics for predicting whether the user is currently ready to perform the desired task. In one example, users that recently used particular domain-specific words in their content for status messages (e.g., a connectivity problem, a cell phone battery problem, etc.), or users that have recently sent status updates within their respective social network (e.g., messages that may indicate that the users are currently busy or not ready to perform the desired task), are identified as not ready to perform the desired task. In one example, the readiness module 120 may use a user's past time usage to determine to the extent the person may be interrupted from other tasks, availability means, such as device readiness and connectivity. In one example, the readiness module 120 filters out users that are not ready to perform the desired task and stores the users are deemed ready in the database 160.

In one embodiment, after users are found to be ready to perform a desired task by the readiness module 120, the willingness module 130 estimates whether the filtered users that are able and ready to perform the task are also willing to perform the task. In one embodiment, the willingness module 130 uses a statistical model of a user's willingness to perform a desired task based on many such users' previous interaction history in one or more social networks and also personality traits. In one example, machine learning is used for training a statistical model from labeled data and using the trained model to predict the user's willingness to perform a desired task. In one embodiment, to train a statistical model of willingness, the willingness module uses users' response history in social media and their past social media content. In one example, the willingness module 130 collects social media content and response history from a set of empirically selected users from their social network. Feature values are then determined for each user from the data.

In one embodiment, responsive features are used to determine values based on past interaction in social media. In one example, the features may include response volume, response rate, response time and proactiveness. In one example, response value includes how many times a person has responded. This feature represents total response count for a user in the social media. In one example, in a given amount of time, a user may have responded to 10 questions, which is used as the particular user's response volume.

In one example, response rate includes how often a person responded. This is the ratio of total number of responses to the total number of questions. In one example, the response time is how fast a person has responded to perform a requested task. This is the average amount of time between asking that a task be performed and receiving a response.

In one embodiment, proactiveness describes whether a user has responded to requested tasks not directly addressed to them or to requests from strangers. In order to facilitate collection of such responsiveness features, the willingness module 130 collects previous response history of each user with their friends in the social media. In one example, in a social media platform, a person can respond to questions sent directly to him using a special tag. A person can also respond to questions that are not directly sent to them.

In one embodiment, the willingness module 130 uses personality features, which are computed based on psycho-linguistic analysis of their social media content. In one embodiment, the psycho-linguistic analysis may be provided using the LIWC (Linguistic Inquiry and Word Count) dictionary and identifying LIWC-based features from social media content. In another embodiment, the analysis is carried out using Big-Five personality traits and identifying features based on Big-Five personality traits. In yet another embodiment, the willingness module 130 uses a social media content feature, such as n-gram computed from social media content, presence/absence of certain words, etc.

In one example, training data is labeled with a binary class value, which indicates whether a person (in the training corpus) actually responded to a request/question addressed to them in the social network. To facilitate collection of the training data and label generation, an agent may send questions to random users in the social media and record whether or not that user actually responded to the sent questions. A statistical model built from this data that computes the above feature may be linear or nonlinear classification, or regression-based. In one example, the willingness module 130 uses the training model to predict a willingness score (i.e., a numerical value, such as 0 to 10, 0 to 100, etc.) for arbitrary users in that social media (from which the model is built), as long as the features for that user can be computed using the available information (e.g., social media content and response history).

Using a willingness score, the willingness module 130 selects users that are willing to perform the task (if the score is higher than a selected threshold numerical value). Based on the willingness estimation, the willingness module 130 determines or filters out users on one or more social platforms that are willing to perform a task (e.g., respond/answer a question) and stores the willing users in the database 160.

In one embodiment, after users are found to be willing to perform a desired task by the willingness module 130, the trustworthiness module 130 estimates whether the filtered users that are able, ready, and willing to perform the task are also trustworthy to provide a response for the task. That is, it is desirable to recruit users that can be trusted to provide truthful responses to the best of their knowledge. In one example, the trustworthiness module 140 estimates a user's trustworthiness based on personality traits, such as one's cautiousness, morality, and dutifulness, as well as one's past social behavior, including how truthful his/her previous responses to others have been based on a number of factors, such as fact-based content, other users' voting on the posts, etc. Based on the trustworthiness estimation, the trustworthiness module 140 determines or filters out users on one or more social platforms that are trustworthy to perform a task (e.g., respond/answer a question) and stores the trustworthy users in the database 160.

In one embodiment, after users are found to be trustworthy to perform a desired task by the trustworthiness module 140, the emotional fitness module 150 estimates whether the filtered users that are able, ready, willing, and trustworthy to perform the task are also emotionally fit to provide a response for the task. That is, it is desirable to recruit users that are emotionally suitable to be engaged on social media and less likely to cause potential side effects, such as starting a feud on social media. In one example, the emotional fitness module 150 estimates a user's emotional fitness based on one's personality in content, including his/her ability to control emotion (immoderation), overall emotional state (cheerfulness versus level of anxiety), extracted by either analyzing the content of his/her past posts or the comments gathered from his/her social network (e.g., friends' posts/responses to the person). Based on the emotional fitness estimation, the emotional fitness module 150 determines or filters out users on one or more social platforms that are emotionally fit to perform a task (e.g., respond/answer a question) and stores the emotionally fit users in the database 160.

Figure 2:
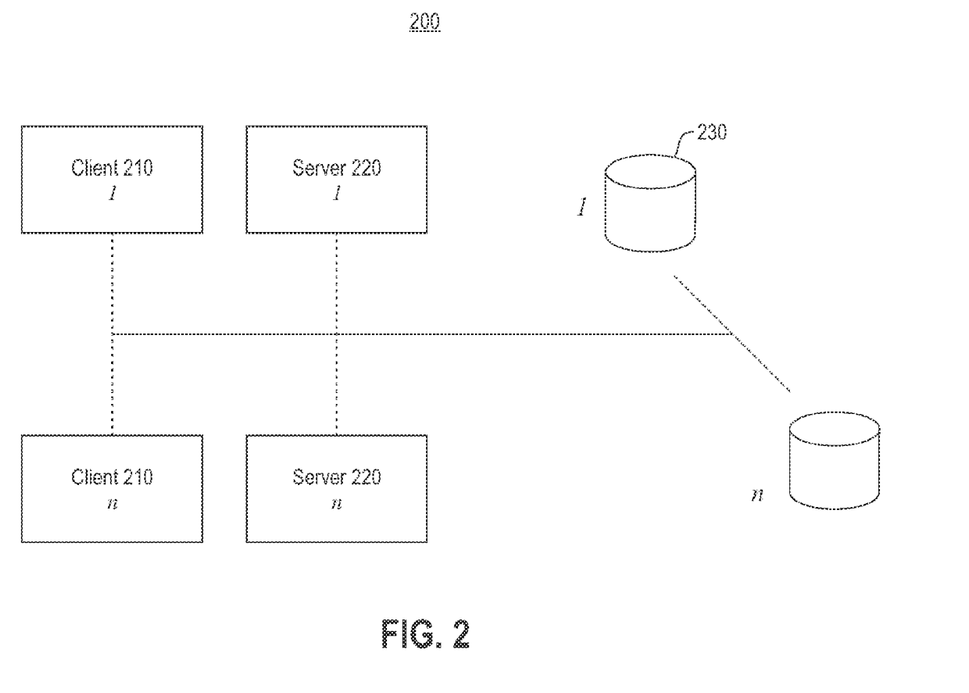
FIG. 2 illustrates a block diagram of an example client/server system utilizing user identification for task performance in social media based on past usage and traits, in accordance with an embodiment of the invention.

FIG. 2 illustrates a block diagram for a system 200, such as a social network platform that employs system 100 for responder identification in social media for task performance based on past usage and traits. In one embodiment, the system 200 includes multiple client devices 210 1-n, multiple server devices 220 1-n and multiple storage devices 230 1-n, where n is a positive number greater than 1. In one example, the system 100 may be used only on client devices 210, only on server devices 220, or on both client devices 210 and server devices 220. In one example, the server devices 220 run the social network platform and users use the client devices 210 to access the social network.

Figure 3:
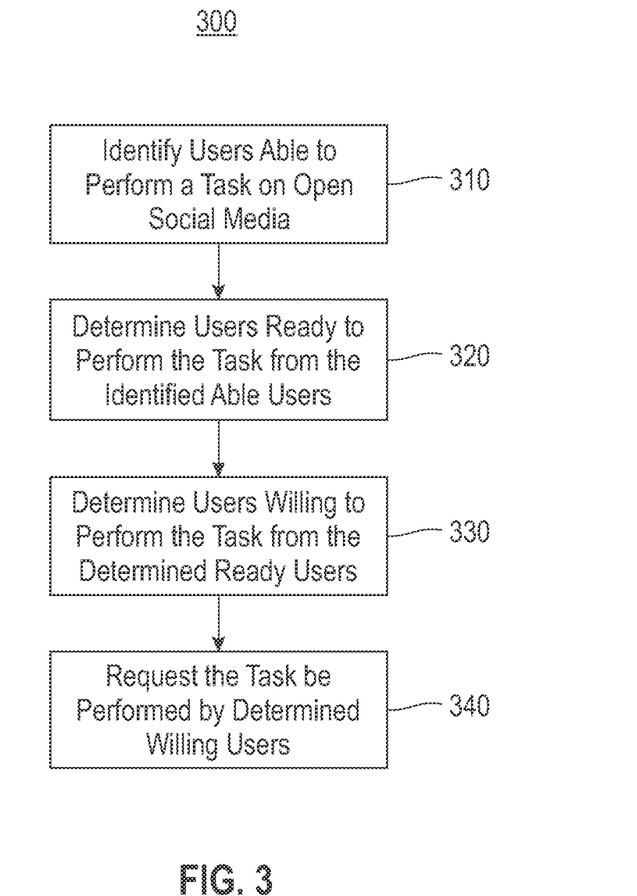
FIG. 3 is a block diagram showing a process for user identification for task performance in social media based on past usage and traits, in accordance with an embodiment of the invention.

FIG. 3 illustrates a flowchart of an example process 300 for responder identification in social media for task performance based on past usage and traits according to one embodiment. In process block 310, users of one or more social media platforms are identified as being able to perform a desired task (e.g., answer a question, respond with information, etc.) on open social media, for example, by the ability module 110 in FIG. 1. In process block 320, users identified as being able to perform a desired task are determined to be ready to perform the desired task, for example, by the readiness module 120 of system 100. In process block 330, the users determined to be ready (and able) to perform are further determined to be willing to perform the desired task by, for example, the willingness module 130 of system 100. In process block 340, the task desired to be performed is sent to the users that are determined to be willing (able and ready) to perform the task, for example, by the task query module 170 of system 100.

In one embodiment, process 300 may further include determining whether the able, ready, and willing users are trustworthy and emotionally fit to respond to perform the desired task, for example, by the trustworthiness module 140 and the emotional fitness module 150.

Figure 4:
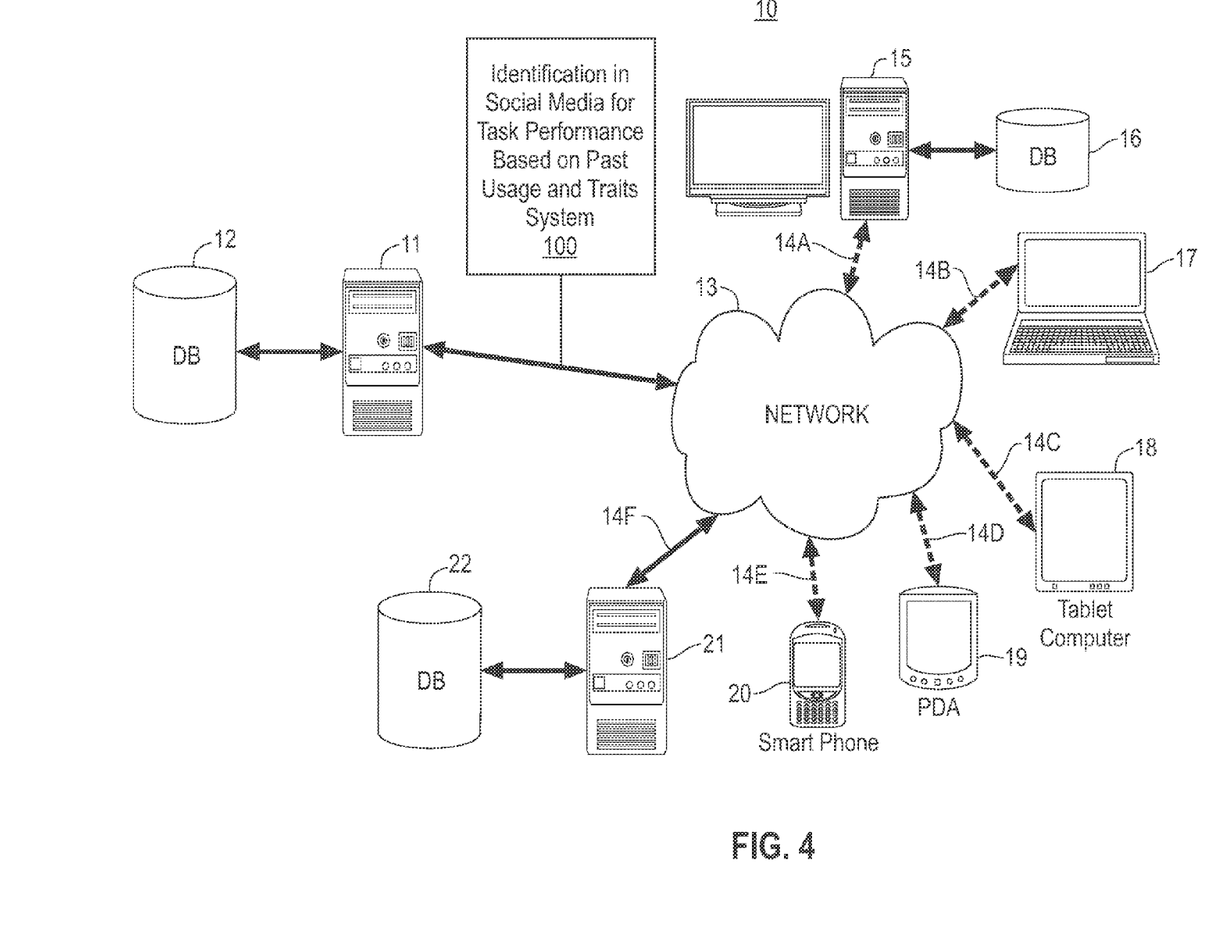
FIG. 4 is a block diagram illustrating an example of a network environment for user identification for task performance in social media based on past usage and traits, according to an embodiment of the present invention.

FIG. 4 illustrates an example of the basic components of an information technology system 10 utilizing system 100, according to an embodiment of the present invention. The information technology system 10 includes a server 11 and remote devices 15 and 17-20 that may utilize the system 100 of the present invention. In one embodiment, the server 11 implements the system 100 of the present invention.

Each of the remote devices 15 and 17-20 has applications and can have a local database 16. Server 11 contains applications, and is connected to a database 12 that can be accessed by remote device 15 and 17-20 via connections 14(A-F), respectively, over a network 13. The server 11 executes software for a computer network and controls access to itself and database 12. The remote device 15 and 17-20 may access the database 12 over the network 13, such as but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The server 11 may also be connected to the local area network (LAN) within an organization.

The remote device 15 and 17-20 may each be located at remote sites. Remote device 15 and 17-20 include but are not limited to, PCs, workstations, laptops, handheld computers, pocket PCs, PDAs, pagers, WAP devices, non-WAP devices, cell phones, palm devices, printing devices, and the like. Included with each remote device 15 and 17-20 is an ability to request relevant material from a large collection of documents via search queries to the server 11. Thus, when a user at one of the remote devices 15 and 17-20 desires to access the system 100 and the database 12 at the server 11, the remote device 15 and 17-20 communicates over the network 13, to access the system 100, the server 11 and database 12.

Third party computer systems 21 and databases 22 can be accessed by the server 11 in order to provide access to additional collections of documents and/or search indexes. Data that is obtained from third party computer systems 21 and database 22 can be stored on server 11 and database 12 in order to provide later access to the user on remote devices 15 and 17-20. It is also contemplated that for certain types of data, the remote devices 15 and 17-20 can access the third party computer systems 21 and database 22 directly using the network 13.

Figure 5:
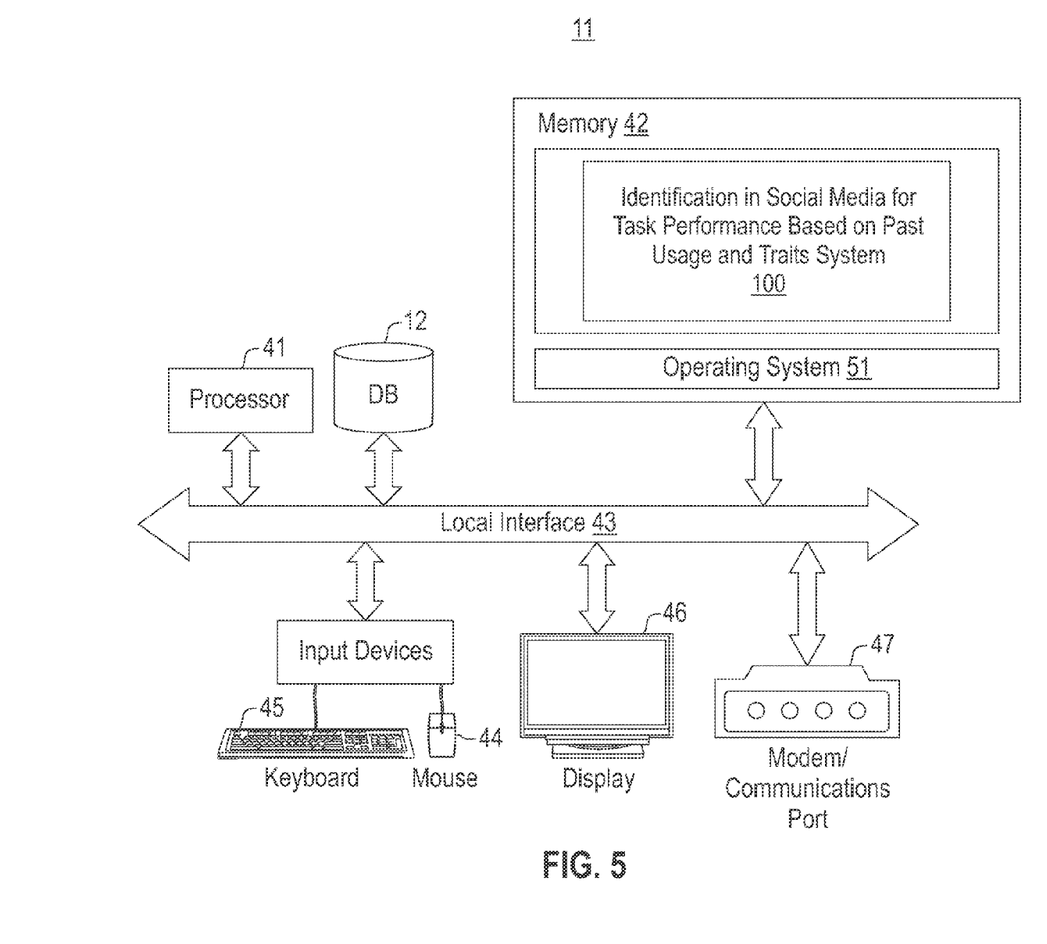
FIG. 5 is a block diagram illustrating an example of a server including a system utilizing identification for task performance in social media based on past usage and traits, according to an embodiment of the present invention, as shown in FIG. 4.

The system 100 utilizes a process for identification for task performance in social media based on past usage and traits, according to an embodiment of the invention. Illustrated in FIG. 5 is a block diagram demonstrating an example of server 11, as shown in FIG. 4, utilizing the system 100 according to an embodiment of the present invention. The server 11 includes, but is not limited to, PCs, workstations, laptops, PDAs, palm devices, and the like. The processing components of the third party computer systems are similar to that of the description for the server 11 (FIG. 5).

Generally, in terms of hardware architecture, as shown in FIG. 5, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 5, the software in the memory 42 includes a suitable operating system (O/S) 51 and the search system 100 of the present invention. The system 100 comprises functional components and process blocks described further below.

The operating system 51 essentially controls the execution of other computer programs, such as the system 100, and provides scheduling, input/output control, file and data management, memory management, and communication control and related services. However, the system 100 of the present invention is applicable on all other commercially available operating systems.

The system 100 may comprise a source program, executable program (object code), script, or any other entity comprising a set of computer program instructions to be performed. When the system 100 is a source program, then the program is usually translated via a compiler, assembler, interpreter, or the like, which may or may not be included within the memory 42, so as to operate properly in connection with the O/S 51. Furthermore, the system 100 can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, starts the O/S 51, and supports the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The system 100 and the O/S 51 are read, in whole or in part, by the processor 41, perhaps buffered within the processor 41, and then executed.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

When the system 100 is implemented in software, as is shown in FIG. 2, it should be noted that the system 100 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

In an alternative embodiment, where the system 100 is implemented in hardware, the system 100 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The remote devices 15 and 17-20 provide access to the system 100 of the present invention on server 11 and database 12 using for example, but not limited to, an Internet browser. The information accessed in server 11 and database 12 can be provided in a number of different forms including, but not limited to, ASCII data, WEB page data (i.e., HTML), XML or other type of formatted data.

As illustrated, the remote device 15 and 17-20 are similar to the description of the components for server 11 described with regard to FIG. 5. The remote devices 15 and 17-20 are referred to as remote devices 15 for the sake of brevity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:
1. A method comprising:
    identifying a plurality of users of a social media platform for ability of performing a task based on machine-learning processing;
    generating predicted readiness scores for the identified users using a readiness model of past usage of the social media platform, the readiness model being trained from patterns of social network content updates including time interval during a day and particular day of week for social network usage behavior, wherein a predicted readiness score comprises a value corresponding to whether a user is predicted to be ready for performing the task;
    determining users that are ready to perform the task based on comparing the predicted readiness scores with a readiness score threshold;
    generating willingness scores, by a willingness processor, for performing the task by the users determined to be able and ready to perform the task based on performing machine learning processing by training a statistical model with psycho-linguistic analysis using a linguistic inquiry and word count (LIWC) dictionary for identifying LIWC-based features from keywords extracted from social media content, wherein a willingness score comprises a value corresponding to whether a user is estimated to be willing for performing the task;
    determining, by the willingness processor, an estimation of users that are willing to perform the task based on comparing the willingness scores with a willingness score threshold;
    filtering the users by determining trustworthy users based on estimating a likelihood of trustworthiness of the users determined to be willing, identified as having the ability based on determining whether the users are present in a current location required for performing the task, and determined to be ready to perform the task, wherein estimating the likelihood of trustworthiness comprises determining personality traits and prior social behavior from keyword extraction processing of the social media content, determining truthfulness of responses on the social media platform by comparing the responses to fact-based content or voting feedback, filtering trustworthy users from non-trustworthy users and storing the trustworthy users in a database; and
    electronically sending a request, by a task query processor, that the task be performed by the determined trustworthy users stored in the database that comprises users determined to be willing, identified as having the ability, determined to be trustworthy and determined to be ready to perform the task,
wherein the current location of users is determined based on social media status updates and determining electronic device location information.

2. The method of claim 1, wherein the likelihood of trustworthiness is based on extracting personality traits and analyzing content comprising textual content of past usage of the social media platform to generate an estimation of the likelihood of trustworthiness.

3. The method of claim 1, further comprising:
    determining emotionally fit users from the determined trustworthy users by estimating emotional fitness based on analyzing, by an emotional fitness processor, keywords from content of past usage of the social media platform or comments from other users relating to the past usage of the social media platform and determine personality traits; and
    requesting the task be performed by the users determined to be emotionally fit to perform the task.

4. The method of claim 1, wherein the identifying the plurality of users of a social media platform for the ability of performing the task further comprises generating an estimation of ability using rules, heuristics and the machine learning processing using statistical models.

5. The method of claim 4, wherein the task comprises an electronic query, and estimating ability comprises employing a processor device to extract keywords from the query and to search social media content associated with the plurality of users for a match of the extracted keywords.

6. The method of claim 5, wherein the task is location based, and determining electronic device location information comprises at least one of using global positioning system (GPS) information and Wi-Fi triangulation information.

7. The method of claim 1, wherein predicting readiness scores further comprises using heuristics based on recently used particular domain-specific words in social media platform content for status messages, or recently sent status updates within the social media platform.

8. The method of claim 7, wherein the patterns are determined based on computer analysis of time interval and day of week, and average type of usage of the social media platform.

9. The method of claim 1, wherein generating willingness scores for performing the task is based on analyzing, by the willingness processor, historical data comprising user response volume, response rate, response time and response to queries from unknown users.

10. The method of claim 9, wherein generating willingness scores for performing the task further comprises performing, by the willingness processor, psycho-linguistic analysis of user social media content.

11. A computer program product for determining capability of task performance in an open social media system, the computer program product comprising:
a non-transitory computer-readable storage device having computer readable program code embodied therewith, the computer readable program code comprising:
computer readable program code configured to identify a plurality of users of a social media platform for ability of performing a task based on machine-learning processing;
computer readable program code configured to generate predicted readiness scores for the identified users using a readiness model of past usage of the social media platform, the readiness model being trained from patterns of social network content updates including time interval during a day and particular day of week for social network usage behavior, wherein a predicted readiness score comprises a value corresponding to whether a user is predicted to be ready for performing the task;
computer readable program code configured to determine users that are ready to perform the task based on comparing the predicted readiness scores with a readiness score threshold;
computer readable program code configured to generate willingness scores for performing the task by the users determined to be able and ready to perform the task based on performing machine learning processing by training a statistical model with psycho-linguistic analysis using a linguistic inquiry and word count (LIWC) dictionary for identifying LIWC-based features from keywords extracted from social media content, wherein a willingness score comprises a value corresponding to whether a user is estimated to be willing for performing the task;
computer readable program code configured to determine an estimation of users that are willing to perform the task based on comparing the willingness scores with a willingness score threshold;
computer readable program code configured to filter the users by determining trustworthy users based on estimating a likelihood of trustworthiness of the users determined to be willing, identified as having the ability based on determining whether the users are present in a current location required for performing the task, and determined to be ready to perform the task, wherein estimating the likelihood of trustworthiness comprises determining personality traits and prior social behavior from keyword extraction processing of the social media content, determining truthfulness of responses on the social media platform by comparing the responses to fact-based content or voting feedback, filtering trustworthy users from non-trustworthy users and storing the trustworthy users in a database; and
computer readable program code configured to electronically send a request that the task be performed by the determined trustworthy users stored in the database that comprises users determined to be willing, identified as having the ability, determined to be trustworthy and determined to be ready to perform the task,
wherein the current location of users is determined based on social media status updates and determining electronic device location information.

12. The program product of claim 11, wherein the likelihood of trustworthiness is based on extracting personality traits and analyzing content comprising textual content of past usage of the social media platform to generate an estimation of the likelihood of trustworthiness.

13. The program product of claim 12, the computer readable program code further comprising:
computer readable program code configured to determine emotionally fit users from the determined trustworthy users by estimating emotional fitness based on analyzing, extracted keywords of content of past usage of the social media platform or comments from other users relating to the past usage of the social media platform and determining personality traits; and
computer readable program code configured to request the task be performed by the users determined to be emotionally fit to perform the task.

14. The program product of claim 11, wherein identify the plurality of users of a social media platform for the ability of performing the task further comprises generating an estimation of ability using rules, heuristics and the machine learning processing using statistical models.

15. The program product of claim 14, wherein the task comprises an electronic query, and estimating ability comprises employing a processor to extract keywords from the query and search social media content associated with the plurality of users for a match of the extracted keywords.

16. The program product of claim 9, wherein the task is location based, and-determining electronic device location information comprises at least one of using global positioning system (GPS) information and Wi-Fi triangulation information.

17. The program product of claim 13, wherein generating willingness scores for performing the task further comprises performing, by a willingness processor, psycho-linguistic analysis of user social media content.

18. A system comprising:
a server device configured to use a hardware processor to identify a plurality of users of a social media platform having ability of performing a task based on machine-learning processing, to generate predicted readiness scores for the identified users using a readiness model of past usage of the social media platform, the readiness model being trained from patterns of social network content updates including time interval during a day and particular day of week for social network usage behavior, wherein a predicted readiness score comprises a value corresponding to whether a user is predicted to be ready for performing the task, to determine users that are ready to perform the task based on comparing the predicted readiness scores with a readiness score threshold, to generate willingness scores for performing the task by the users determined to be able and ready to perform the task based on performing machine learning processing by training a statistical model with psycho-linguistic analysis using a linguistic inquiry and word count (LIWC) dictionary to identify LIWC-based features from keywords extracted from social media content, and a willingness score comprises a value corresponding to whether a user is estimated to be willing to perform the task, to determine users that are willing to perform the task based on comparing the willingness scores with a willingness score threshold, to filter the users by determining trustworthy users based on estimating a likelihood of trustworthiness of the users determined to be willing, identified as having the ability based on determining whether the users are present in a current location required for performing the task, and determined to be ready to perform the task, wherein estimating the likelihood of trustworthiness comprises determining personality traits and prior social behavior from keyword extraction processing of the social media content, determining truthfulness of responses on the social media platform by comparing the responses to fact-based content or voting feedback, filtering trustworthy users from non-trustworthy users and storing the trustworthy users in a database, and to electronically send a request that the task be performed by the trustworthy users stored in the database that comprises users determined to be willing, identified as having the ability, determined to be ready and trustworthy to perform the task, wherein the current location of users is determined based on social media status updates and determining electronic device location information.

19. The system of claim 18, wherein the server further using the hardware processor for:

determining emotionally fit users of the determined trustworthy users by estimating emotional fitness based on analyzing, by an emotional fitness processor, extracted keywords from electronically searching content of past usage of the social media platform or electronically searching comments from other users relating to the past usage of the social media platform and determining personality traits; and requesting the task be performed by the users determined to be emotionally fit for performing the task, wherein the likelihood of trustworthiness is based on extracting personality traits and analyzing content comprising textual content of past usage of the social media platform.

20. The system of claim 19, wherein the server further using the hardware processor for collecting responses from the estimated trustworthy users, parsing and collating responses from previously performed tasks, ranking responses based on selected weights, and forwarding the responses based on the selected weights for display on a client device.

* * * * *